United States Patent [19]

Miksitz

[11] 4,085,871
[45] Apr. 25, 1978

[54] ORBITAL PLATE FEEDER

[76] Inventor: Frank J. Miksitz, 603 Barrymore St., Phillipsburg, N.J. 08865

[21] Appl. No.: 691,303

[22] Filed: Jun. 1, 1976

[51] Int. Cl.² .............................................. B65G 65/48
[52] U.S. Cl. .................................................. 222/404
[58] Field of Search ............... 222/193, 404, 411, 410; 302/53, 56; 214/17 D, 17 DA

[56] References Cited

U.S. PATENT DOCUMENTS 3,874,566  4/1975  Miksitz ................................ 222/404

Primary Examiner—Robert B. Reeves
Assistant Examiner—John P. Shannon
Attorney, Agent, or Firm—Cushman, Darby & Cushman

[57] ABSTRACT

In a feeder for granular material the material passes in a controlled manner from a mass thereof downwardly through a central feed aperture in a horizontal feed plate which is driven in a horizontal orbital path above a bottom wall having a discharge aperture therein. An annular plate overlies the periphery of the feed plate for the purpose of reducing the tendency of the feed plate to become jammed by the granular material. To further reduce this tendency the feed plate has studs projecting from its lower surface into sliding contact with the bottom wall, and inner and outer rings are provided between the inner and outer edges, respectively, of the feed plate and the bottom wall so as to orbit with the feed plate.

11 Claims, 3 Drawing Figures

ORBITAL PLATE FEEDER

This invention relates to apparatus for effecting controlled gravity assisted flow of granular material from an upper zone into a lower zone by means of a horizontal orbiting annular feed plate.

BACKGROUND

The present invention constitutes an improvement in the kind of apparatus disclosed in U.S. Pat. Nos. 3,809,286 and 3,874,566 and in U.S. Pat. No. 4,015,747. The subject matter of both patents and the application are incorporated herein by reference.

The prior patents and the prior application disclose apparatus in which the feeding or discharging of granular material from a mass thereof is effected and closely controlled by a special arrangement of a centrally apertured horizontal feed plate disposed below a shroud or baffle at least the lower end of which is located within the mass of material. The construction and disposition of the shroud and feed plate is such that the granular material does not flow spontaneously by gravity through the central feed aperture in the feed plate when the latter is stationary. However, in some situations the granular material does flow spontaneously to an extent into the periphery of the space directly below the shroud where it comes to rest in the form of an annular mass of material of which at least a portion resides on the upper surface of the plate. Thereafter, the plate is driven in an orbital path about a vertical axis with the result that granular material on the plate is carried inwardly with respect to the vertical axis of the shroud. As this occurs an additional quantity of material flows by gravity from the main mass into the space formerly occupied by the displaced quantity thereby preventing reverse displacement of the initially displaced quantity during continued orbital movement. In one form of the apparatus, the feed plate moves relative to the initially displaced material so that an edge portion of the feed aperture in the plate moves under this material which then passes through the aperture by gravity. The overall result is that granular material is continuously fed downwardly through the feed plate along a path which moves around the circumference of the feed aperture, the flow of material being proportional to the speed of the plate.

In another form of apparatus it is necessary for the feed plate to reach out beyond the periphery of the shroud in order for it to perform a proper feeding or discharging operation. This may be necessary, for example, if the granular material has little or no tendency to flow inwardly under the shroud. This condition may be present if the material is finely-divided and non-free-flowing as may be the case with especially cohesive or sticky substances. The condition may also result if the material contains lumps which are of large size relative to the vertical distance between the shroud and the feed plate. For example, some powders which are readily free-flowing once they are put in motion tend to form arches within the mass of powder when a portion of the material is removed by gravity through a feed or discharge aperture with the result that flow through the aperture will be intermittent or cease altogether. In the case of chunky material containing lumps of irregular size and shape, the material may wedge between the shroud and the feed plate and impede or prevent flow of the material.

In the preferred form of the apparatus there is provided a feed plate having a central feed aperture which is larger than a discharge aperture in a horizontal shelf or wall over which the feed plate is mounted. In this construction, orbital movement of the feed plate displaces the granular material inwardly toward its center in the manner described above but instead of falling by gravity through the feed aperture in the feed plate the material is first deposited on the shelf and is subsequently pushed over the edge of the discharge aperture in the latter by continued orbital movement of the feed plate. This arrangement permits a smaller area of contact between the lower surface of the feed plate and the shelf and thereby reduces friction at this location. The same is true with respect to reduced friction between the upper surface of the feed plate and the mass of granular material. In addition, the feed plate tends to remain buried by the granular material, and this is advantageous in protecting the feed plate from any corrosive atmosphere which may be present. This type of feed plate may have a diameter either greater or smaller than the shroud.

Orbital movement of a feed plate means that the plate moves in a generally circular path either with or without rotation about its own axis. When there is no rotation of the plate about its own axis, all points on the plate move in circular paths of the same radius which is small compared to the radius of the plate. When the plate also rotates about its own axis, the plate moves generally as if its circumference were rolling along the inside of a ring of slightly greater diameter than the plate. The form or location of the drive means employed to effect either type of movement is usually immaterial.

By granular material is meant any solid or semi-solid material in the form of discrete particles, grains or lumps without regard to size or density so long as the material can be made to flow downwardly by gravity when acted on by the feed plate. The term encompasses all types of finely divided material including ground cement, as well as larger particulate matter, such as sand, stone and coal.

With some materials such as coal it has been found that fine particles of the material tend to lodge between the lower surface of the feed plate and the upper surface of the bottom wall or shelf of the bin or other container. As the fine particles accumulate there is a tendency for the feed plate to be forced upwardly with the result that the drive connection between motor and the feed plate may bind. This accumulation is generally less likely to occur when the feed plate is free to roll about its own axis during its orbital movement. When little or no rolling movement is permitted the tendency is more pronounced. In any event periodic reversal of the direction of movement of the plate can often be employed to reduce or prevent the tendency of the feed plate to move upwardly. It has been found that this tendency is further reduced when the reversal feature is used for a feed plate which is provided with studs or other projections on its lower surface. In this construction it is thought that the particulate material packs between the studs and forms a scrubbing surface which tends to prevent further accumulation of particulate material. In any event the use of studs or their equivalent together with a periodic drive reversal in a machine where only partial rolling of the feed plate occurs has been found in many instances to prevent binding of the feed plate drive under operating conditions where binding did occur with a smooth feed plate operated in only one direction.

The problem of feed-plate binding has not been entirely solved however. Under some circumstances there is a tendency for the material to cause binding, even when a studded feed plate is periodically orbited in opposite directions.

SUMMARY OF PRESENT INVENTION

The present invention is directed to making improvements to orbital plate feeding or discharge devices for the purpose of further reducing the tendency of the feed plate to become jammed by the granular material which is being fed.

For this purpose it has been found useful to place a ring-like plate structure, hereinafter referred to as a retaining ring, within the mass of granular material and closely overlying but not connected to at least the leading edge of the orbiting feed plate while leaving a radially inward portion of the plate exposed to the mass of material. The leading edge of the feed plate is of course that edge which lies the greatest radial distance from the axis of the orbit as the plate orbits, regardless of whether the plate rotates about its own axis. The retaining ring is preferably in the form of an annular plate which overlies the entire periphery of the feed plate in all orbital positions of the latter, and preferably the ring is free-floating, i.e. not fixed in position. If free-floating the ring rests on top of and is supported by the feed-plate and may be restrained against horizontal movement by loosely engaging the side wall of the container. It is contemplated that the retaining ring may also be fixed in position, as by being connected to and supported by the side wall of the container which holds the granular material. The retaining ring may be any plate-like structure having an aperture therethrough sized to expose part of the feed plate inwardly of the leading edge of the latter. Generally of course the aperture will be circular. The periphery of the ring will generally be shaped complementary to the inner horizontal cross-section of the container and small enough to leave an annular gap between its outer edge and the side wall of the container.

The invention also contemplates two further rings, hereinafter referred to as wiper rings, which fit against the inner and outer edges of the feed plate and which slidably engage the upper surface of the bottom wall. These wiper rings are preferably floating but in some cases they may be fixed to the feed plate.

In operation of a device which is provided with the retainer ring, the outer edge of the feed plate is constantly shielded during feed plate orbiting. The retainer ring provides a cavity or pocket for the outer edge of the feed plate to orbit in. As the feed plate moves into the bulk material the outer edge does not have to cut or displace bulk material. Without the retainer ring the outer edge of the feed plate has to displace bulk material equal to the thickness of the feed plate plus the height of the studs. Since there are some bulk materials that cannot be easily displaced, the retainer ring allows the feed plate to feed all manner of bulk materials regardless of densities particles, size, mixtures of crushed and fine materials and materials which can be consolidated by packing. Further, the mass of bulk material residing on top of the retainer ring retains the feed plate and prevents the feed plate from riding up during operation of the feeder. Still further, the gap between the outer edge of shielding ring and inside vertical feeder wall serves as a relief valve. Without such an opening fine particles can be trapped in the pocket and paralyze the operation of the feeder.

The purpose of the outer floating wiper ring is to prevent larger than fine powder materials from entering or working under studded feed plate. Without the floating wiper ring certain crushed or processed size bulk materials can work their way under feed plate and progressively wedge or jack it up to the maximum sized particle size of the given gradation of sizes.

The inner floating wiper ring for the inner edge of the feed plate serves the same function as the outer wiper ring.

DETAILED DESCRIPTION

The invention will be further understood from the following more detailed description of an exemplary embodiment, taken with the drawings in which.

Figure 1:
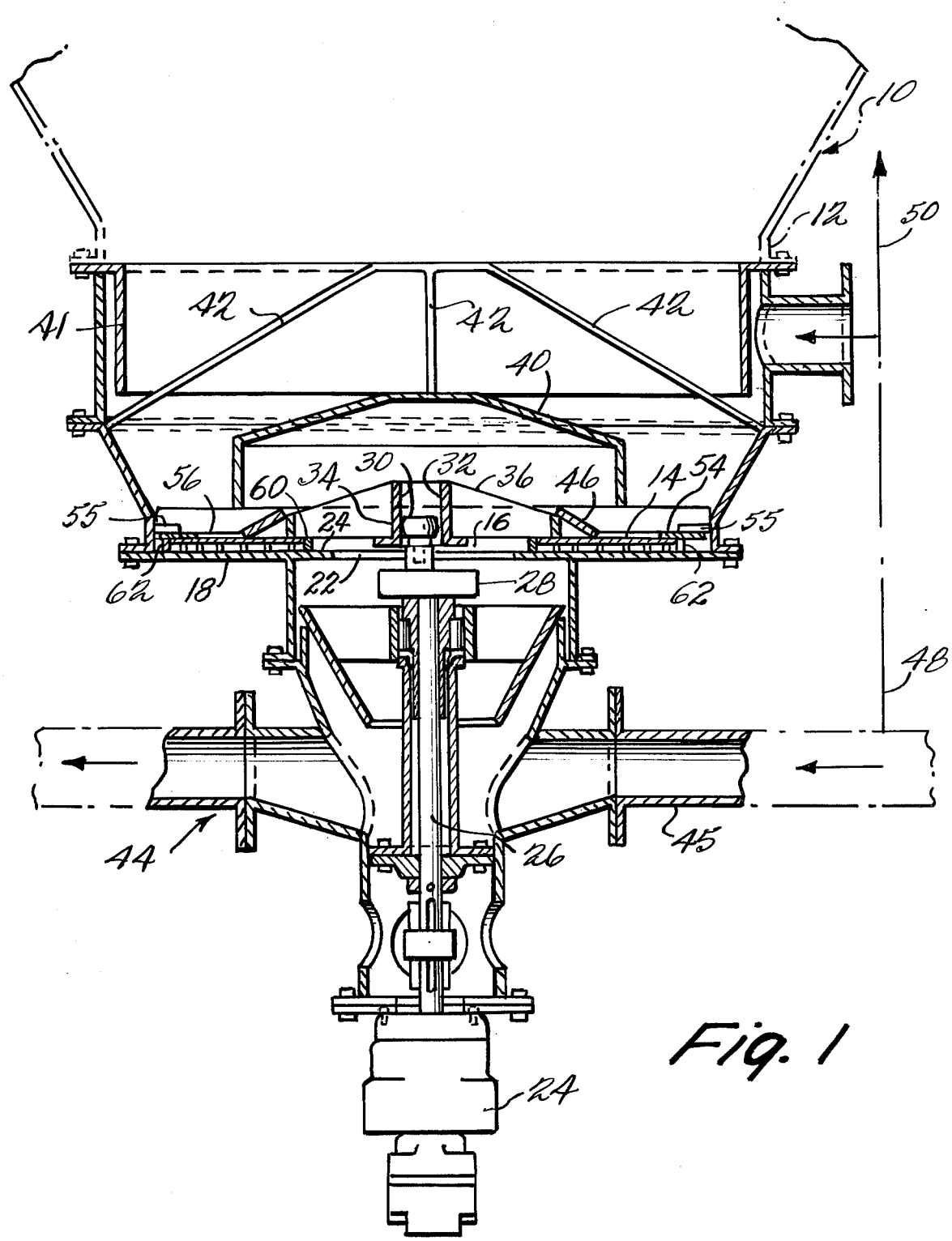
FIG. 1 is a vertical sectional view of an orbital plate feeder embodying the principles of the present invention.

Referring to the figures there is shown an orbital plate feeder fitted to a container 10 having a circumferential side wall 12 at its lower end. The feeder includes a horizontal circular annular feed plate 14 having a central circular feed aperture 16. The feed plate 14 is supported on the upper surface of a fixed horizontal annular bottom wall 18 having a discharge aperture 22. The feed aperture 16 is of larger diameter than the discharge aperture 22 so that the inner portion 24 of the bottom wall 18 forms a shelf over which the granular material is pushed during orbiting of the feed plate 14.

The orbital drive for the feed plate 14 includes an electric motor 24 having a vertical shaft 26 coaxial with the discharge aperture 22 in the bottom wall 18. The upper end of the shaft 26 carries a lateral arm 28 the outer end (not shown) of which carries a stub shaft 30. The stub shaft 30 is slidably engages in the bore 32 of a central hub 34 which is fixed to the feed plate 14 by spokes 36. The axis of the feed aperture 16 is thereby offset from the axis of the discharge aperture 22. When the shaft 26 rotates, the feed plate orbits around the axis of the shaft 26 and the axis of the discharge aperture 22.

The lower surface of the feed plate 14 carries stud-like elements 38 which slide over the surface of the bottom wall 18 and aid in preventing the accumulation of fine particles of the granular material between the lower surface of the plate 14 and the upper surface of the wall 18.

A fixed generally cylindrical shroud 40 is disposed above the bottom wall coaxial with the axis of the discharge aperture 22. Braces 42 support the shroud 40 from the walls of the container.

The illustrated apparatus is adapted for feeding powdered material into a pneumatic conveyor conduit 44. In feeding the pneumatic conveyor conduit 44 the powder which spontaneously flows inwardly under the shroud 40 may become aerated or partially fluidized by adventitious pressure fluctuations in the system; in such instance the aerated material might flow through the discharge aperture 22 at irregular or uncontrolled rates if not prevented from doing so. The feed plate 14 is constructed with an annular dam 46 which surrounds the feed aperture 16 and which is inclined downwardly and radially outwardly as shown. The upper edge of the dam 46 is disposed high enough above the feed plate 14 to block the spontaneous or uncontrolled flow of powdered material into the feed aperture 16. The dam 46 may extend upwardly to a point above or below the lower edge of the shroud 40. In either case, upon orbital movement of the feed plate 14, the granular material will be urged over the dam 46 so as to pass through the apertures 16 and 22 into the pneumatic conveyor conduit 44 through which a stream of air is passing in a leftward direction.

The conveying air passing the point of discharge can cause a lowered pressure at that point due to a siphoning effect of the high velocity air stream. This may cause pressure disturbances near the feed plate 14 with resultant fluidization of the powder. To equalize pressure and prevent such pressure disturbances, a porous or perforated annular curtain 41 is provided in the granular material near or above the shroud 40, and a pressurized air conduit 48 leads from the upstream portion 45 of the conveyor conduit 44 into the area adjacent the curtain 41. A second pressurized air conduit 50 terminates in the top of the closed bin or container 10. A secondary benefit of the conduits 48 and 50 is momentary aeration caused by pressure fluctuations which would promote flow and minimize the possibility of hang-up of material. The apparatus can be employed in pneumatic conveying systems in which suction is applied to the downstream end of the conveyor tube and the upstream end of the conveyor tube is open to the atmosphere. Pressure equalization lines are not required when feeding into a vacuum conveying system.

All of the above is disclosed in greater detail in U.s. Pat. Nos. 3,809,286, 3,874,566 and 4,015,747. The present invention provides a retaining ring 54 which aids in preventing jamming or binding of the feed plate 14 during operation. The retaining ring 54 is in the form of an annular plate which floats on the upper surface of the feed plate 14 and which is spaced from the side walls of the container by means of radial spoke-like elements 55 attached to the ring 54 but not to the side wall. The central aperture 56 in the retaining ring is of a size such that the entire periphery of the feed plate 14 is covered regardless of the orbital position of the latter, yet an annular portion of the feed plate 14 is exposed to the granular material. During operation of the feed plate 14, the ring 54 moves within the restraints placed on it by the feed plate 14 and by the side wall of the container 10. That is, the ring 54 may rotate or not depending on the various frictional forces acting on it. It has been found that the presence of the ring 54 tends to prevent the granular material from wedging between the edge of the feed plate 14 and the container side wall. The ring 54 also aids in preventing accumulation of fine particles of the material between the feed plate 14 and the bottom wall 18.

The feeder also includes a floating inner wiper ring 60 having a lower surface slidably engaging the upper surface of the shelf portion of the bottom wall 18. The wiper ring 60 engages but is not connected to the inner edge of the feed plate 14, i.e., the periphery of the aperture 16, so that orbital movement of the feed plate 14 produces orbital movement of the wiper ring 60. In some cases, it may be useful to connect the ring 60 to the feed plate 14.

A floating outer wiper ring 62 is disposed around the outer edge of the feed plate 14 below the retainer ring 54. This ring slidably engages the upper surface of the bottom wall 18 and is not attached to either the feed plate 14 or the retainer ring. In some cases it may be useful to connect the ring 62 to the feed plate 14.

The operation of the feed plate 14 is described in detail in the aforementioned patents and need not be described here. The overall result of orbiting of the feed plate is that the granular material is continuously fed, at a rate proportional to the orbital speed, through the feed aperture and into the discharge aperture 22. The path of the flowing material continuously moves around the periphery of the discharge aperture 22.

The inner wiper ring 60 can be used to form a dam around the periphery of the feed aperture in the feed plate 14 for the purpose of preventing flushing of granular material through the feed aperture. In this embodiment the dam structure 46 shown in FIG. 1 is omitted and the vertical thickness of the wiper ring 60 is increased.

The inner wiper ring 60 can be used to advantage in some cases without also using the retainer ring 54.

Figure 2:
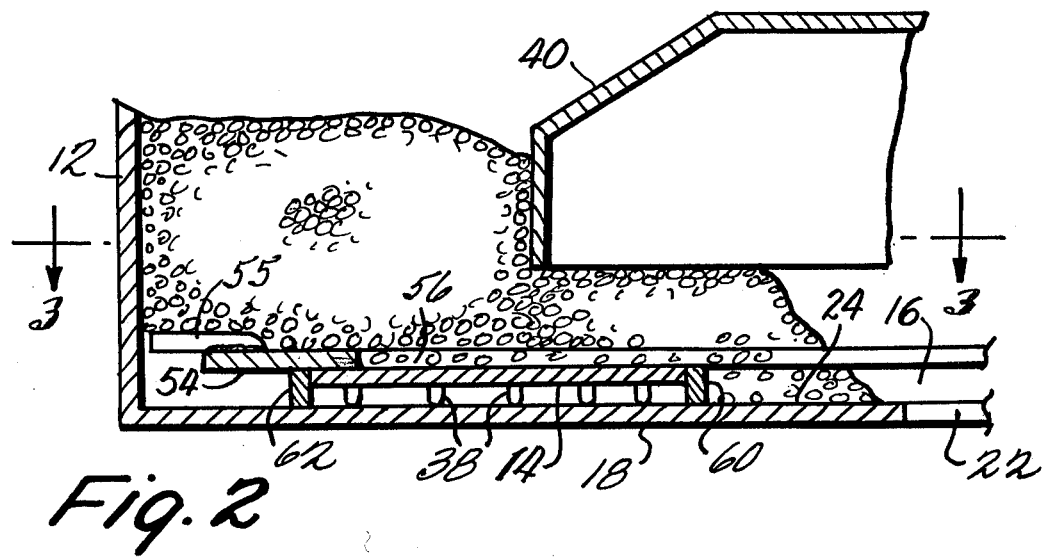
FIG. 2 is an enlarged view of part of FIG. 1.
Figure 3:
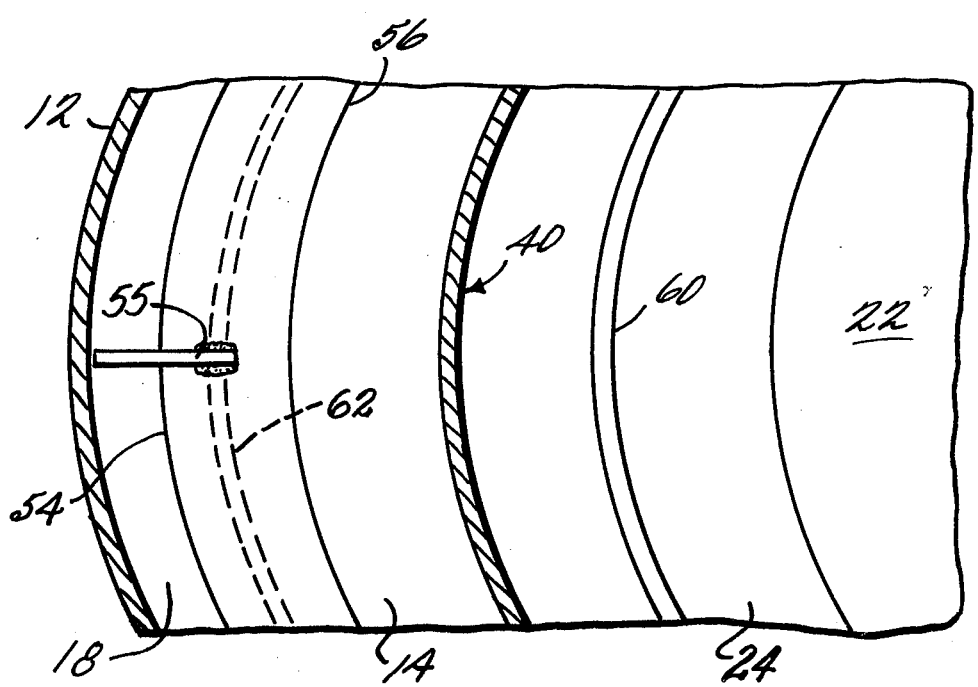
FIG. 3 is a sectional view taken on the line 3—3 of FIG. 2.

The retainer ring 54 can be supported on the bottom wall 18 of the container 10, rather than on the feed plate 14, by providing studs or the like on the lower surface of the retainer ring 54. In this embodiment the lower ends of the studs ride on the upper surface of the wall 18 so as to position the retainer ring in generally the same location as is shown in FIGS. 1 and 2.

What is claimed is:

1. In apparatus for feeding granular material with gravity assist from a mass of the material, said apparatus having a shroud positioned with at least its lower end disposed within the mass of material, a horizontal centrally apertured feed plate disposed directly below the shroud and having an upper surface at least partially exposed to the mass of material, the arrangement being such that the material does not flush freely through the central aperture in the feed plate, and means for orbiting said feed plate about a vertical axis so that during orbital movement of the feed plate material from the mass passes in a controlled manner into the central aperture in the feed plate, the improvement comprising an annular plate disposed within the mass of material independent of the feed plate, said plate closely overlying at least the leading edge of the orbiting feed plate while leaving a radially inward portion of the plate exposed to the mass of material, thereby reducing the tendency of the feed plate to become jammed by the granular material.

2. Apparatus as in claim 1 wherein said plate is fixed in position.

3. Apparatus as in claim 1 wherein said plate is free-floating and is supported at least partially by said feed plate.

4. Apparatus as in claim 1 wherein said plate is an annular ring, said apparatus further including a container having a side wall and having a horizontal bottom wall provided with a discharge aperture which is in register with and of smaller diameter than the aperture in the feed plate so that the annular portion of the bottom wall surrounding the discharge aperture forms a shelf over the edge of which the granular material is pushed by the feed plate during orbital movement thereof.

5. Apparatus as in claim 4 wherein said ring is free-floating on top of the feed plate and wherein the outer edge of said ring is spaced inwardly from the side wall.

6. Apparatus as in claim 4 including a horizontal annular wiper ring having a lower surface in sliding contact with the upper surface of said bottom wall, said wiper ring cooperating with one of the inner or outer edge portions of the feed plate so that said wiper ring moves with the feed plate.

7. Apparatus as in claim 5 wherein there are two wiper rings, one cooperating with the inner edge of the feed plate and the other cooperating with the outer edge of the feed plate.

8. Apparatus as in claim 1 wherein said plate has an outside diameter greater than the diameter of the feed plate and an inside diameter such that the entire periphery of the feed plate is covered regardless of the orbital position of the latter and such that a substantial portion of the upper surface of the feed plate is uncovered.

9. Apparatus as in claim 4 wherein said ring has an outside diameter greater than the diameter of the feed plate and an inside diameter such that the entire periphery of the feed plate is covered regardless of the orbital position of the latter and such that a substantial portion of the upper surface of the feed plate is uncovered.

10. Apparatus as in claim 9 wherein said ring is free-floating on top of the feed plate and wherein the outer edge of the ring is spaced inwardly from the side wall.

11. Apparatus as in claim 9 wherein said ring is fixed in position and wherein the outer edge of the ring is spaced inwardly from the side wall.

* * * * *